(12) United States Patent
Ezequiel

(10) Patent No.: US 11,170,372 B2
(45) Date of Patent: Nov. 9, 2021

(54) METHOD FOR VALIDATING AN ELECTRONIC TRANSACTION, AND SYSTEM THEREOF

(75) Inventor: Ruiz Rodriguez Ezequiel, Panama (PA)

(73) Assignee: Naxos Finance SA, Luxembourg (LU)

( * ) Notice: Subject to any disclaimer, the term of this patent is extended or adjusted under 35 U.S.C. 154(b) by 646 days.

(21) Appl. No.: 14/343,158

(22) PCT Filed: Sep. 7, 2012

(86) PCT No.: PCT/EP2012/067560
§ 371 (c)(1),
(2), (4) Date: Apr. 9, 2014

(87) PCT Pub. No.: WO2013/034725
PCT Pub. Date: Mar. 14, 2013

(65) Prior Publication Data
US 2015/0149360 A1    May 28, 2015

(30) Foreign Application Priority Data

Sep. 9, 2011 (WO) ................. PCT/EP2011/065611

(51) Int. Cl.
*G06Q 20/40* (2012.01)
*G06Q 20/32* (2012.01)
*G06Q 20/42* (2012.01)

(52) U.S. Cl.
CPC ....... *G06Q 20/4012* (2013.01); *G06Q 20/322* (2013.01); *G06Q 20/325* (2013.01); *G06Q 20/3278* (2013.01); *G06Q 20/425* (2013.01)

(58) Field of Classification Search
None
See application file for complete search history.

(56) References Cited

U.S. PATENT DOCUMENTS 7,158,776 B1 * 1/2007 Estes ...................... H04L 63/02
                                                    380/247
8,509,734 B1 * 8/2013 Gupta .................... G06Q 20/04
                                                    455/406

(Continued)

FOREIGN PATENT DOCUMENTS

TW          1344620         7/2011
WO      WO 2006/128171     11/2006

(Continued)

OTHER PUBLICATIONS

PayPal Transaction types, Jun. 14, 2010, https://www.paypalobjects.com/en_US/vhelp/paypalmanager_help/transaction_type_codes.htm (Year: 2010).*

(Continued)

*Primary Examiner* — David P Sharvin
(74) *Attorney, Agent, or Firm* — Workman Nydegger

(57) ABSTRACT

A method for validating an electronic transaction, including a step 100) of starting an electronic transaction transmitting wirelessly identifying information from an electronic payment instrument module of a mobile phone to a POS terminal, that forwards said identifying information together with transaction data to a retailer network and to a server. The method also includes the steps:
  110) activating said mobile phone for starting a voice telephone call with the server;
  120) the server replies said voice telephone call and requests the customer to validate the electronic transaction by means of a validating PIN code; or initiating a voice telephone call from the server to the mobile phone, wherein the server requests the customer to validate the electronic transaction by means of a validating PIN code;

(Continued)

130) the customer validates the electronic transaction communicating the validating PIN code to the server during said voice telephone call.

17 Claims, 3 Drawing Sheets

(56) References Cited

U.S. PATENT DOCUMENTS

| | | | |
|---|---|---|---|
| 2002/0181710 A1* | 12/2002 | Adam | G06Q 20/02 |
| | | | 380/270 |
| 2004/0267663 A1 | 12/2004 | Karns et al. | |
| 2007/0156436 A1 | 7/2007 | Fisher et al. | |
| 2009/0112765 A1* | 4/2009 | Skowronek | G06Q 20/322 |
| | | | 705/44 |
| 2009/0206993 A1* | 8/2009 | Di Mambro | G07C 9/37 |
| | | | 340/5.84 |
| 2010/0102122 A1* | 4/2010 | Skowronek | G06Q 20/32 |
| | | | 235/380 |

FOREIGN PATENT DOCUMENTS

| | | |
|---|---|---|
| WO | WO2006128171 * | 11/2006 |
| WO | WO2006128171 A2 * | 11/2006 |
| WO | WO-2006128171 A2 * | 11/2006 ............ G06F 21/32 |

OTHER PUBLICATIONS

International Search Report for Application No. PCT/EP2012/067560 dated Jan. 15, 2013.
Taiwanese Office Action for Application No. 101132813 dated Jul. 28, 2014.
European Office Action for Application No. 12 759 087.5 dated Dec. 7, 2015.

* cited by examiner

METHOD FOR VALIDATING AN ELECTRONIC TRANSACTION, AND SYSTEM THEREOF

The present application claims priority from PCT/EP2012/067560 filed on Sep. 7, 2012, which claims priority from PCT/EP2011/065611 filed on Sep. 9, 2011, the disclosures of which are incorporated herein by reference in their entirety.

FIELD OF THE INVENTION

Moreover, the present invention relates to an associated system for validating an electronic transaction.

It is noted that citation or identification of any document in this application is not an admission that such document is available as prior art to the present invention.

At the state of the art, electronic financial instruments (such as, for example, smart cards, credit cards and debit cards) are widely used by consumers as a useful and comfortable way to conduct financial transactions with the help of electronic devices.

Usually, some of said financial instruments have contactless interfaces and employ a variety of wireless technologies, including Bluetooth, infrared, and radio frequency such as RFID (radio frequency identification) technology. One form of RFID technology that has been recently used in smart cards is the Near Field Communications (NFC), which permits exchange of data between an RFID device or "tag" and an RFID reader, when the tag and reader are touched or brought within several centimeters or inches of each other.

RFID devices employing NFC technology operate at a radio frequency range of about 13.56 MHz, use very small amounts of power, and comply with published standards, including ISO (International Standards Organization), ECMA (formerly European Computer Manufacturers Association) and ETSI (European Telecommunications Standards Institute).

Said electronic financial instruments have been made even more comfortable with their association with electronic devices that store and use the account information of the associated financial instrument.

In fact, such technology has also been placed in wireless telephones, PDA (Personal Digital Assistant) and similar devices, which can be used as electronic payment instruments in lieu of card-like structures.

It is clear that this association eliminates the need for a consumer to carry both an electronic device, both a separate card; thus, the account data (for one or more card accounts) may be stored in and used from a single mobile device (e.g. a cell phone) that is carried by the consumer.

Unfortunately, electronic financial instruments associated with wireless or other mobile devices have increased the risk of fraudulent transactions.

As an example, when a mobile phone employing wireless signalling (RFID or NFC features) is used by a consumer, the user places the mobile phone near a reader of a POS (Point Of Sale) system, and after the reader identifies the user and initiates a transaction, the user is typically required to enter an authentication PIN (Personal Identification Number), known only to the user, thereby enabling the user to authenticate both himself or herself, both the electronic transaction.

It is known that thieves have devised various means to steal PIN information and, if also the mobile phone is stolen, it may be used with the stolen PIN to conduct such kind of electronic transactions.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of any previously described product, method of making the product, or process of using the product.

SUMMARY OF THE INVENTION

In this frame, it is the main object of the present invention to provide a method for validating an electronic transaction, and a system thereof, conceived in a manner such as to overcome the drawbacks of pier-art solutions.

In particular, it is one object of the present invention to provide a method and/or a system for validating an electronic transaction, said method and/or system being able to eliminate the risk of fraudulent transactions.

It is another object of the present invention to provide a method for validating an electronic transaction, and a system thereof, which are so designed as to require no excessively costly and virtually unfeasible solutions.

Said objects are achieved by the present invention through a method for validating an electronic transaction, and a system thereof, incorporating the features set out in the appended claims, which are intended as an integral part of the present description.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
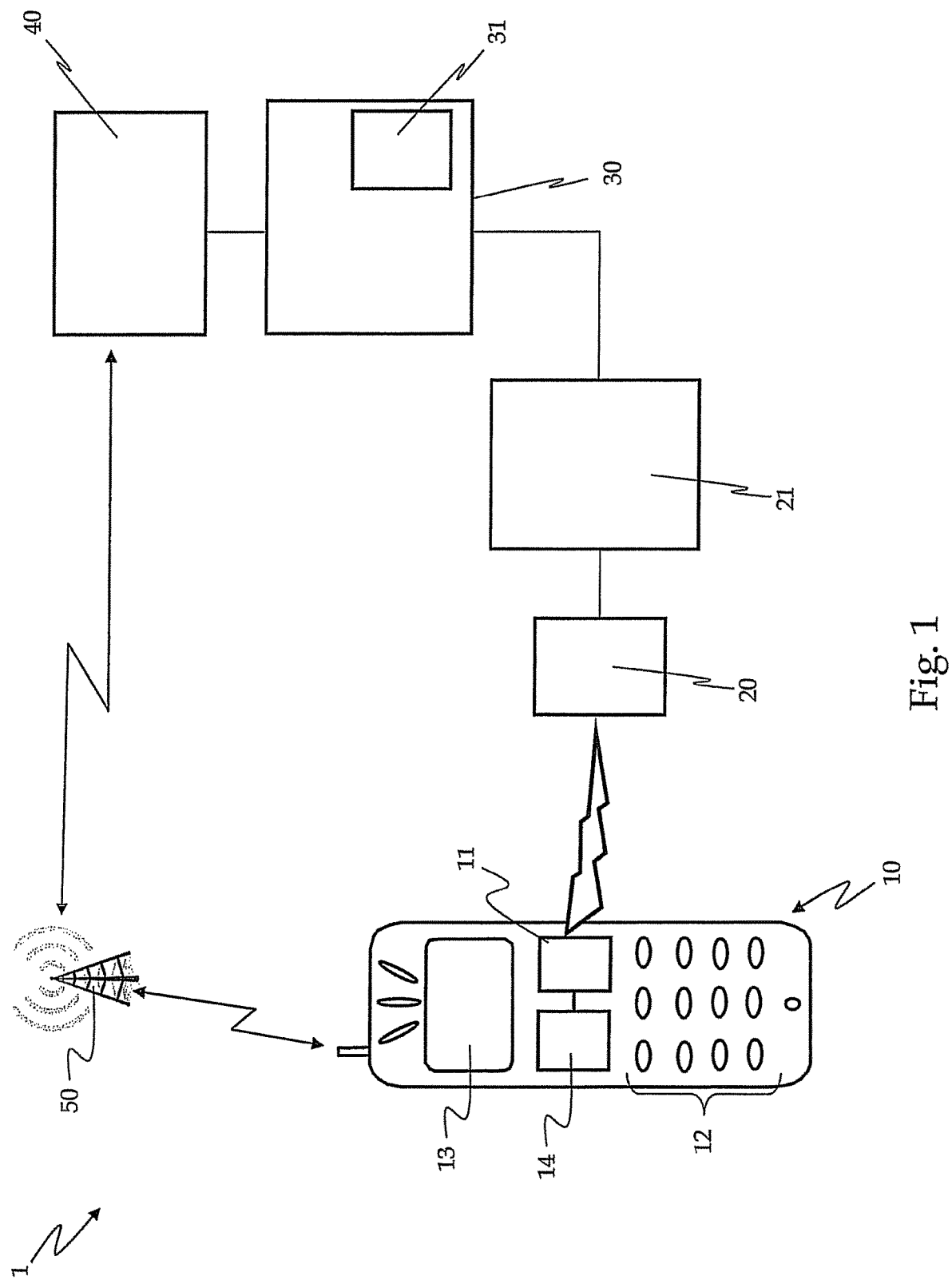
FIG. 1 is a schematic view of a system for validating an electronic transaction according to the present invention.

Referring now to the annexed drawings, in FIG. 1 reference numeral 1 designates as a whole a system according to the present invention.

In particular, the system 1 comprises a mobile phone 10 apt to be used both as a communication device (for making telephone calls, sending SMS and, if web enabled, for sending emails, accessing internet websites, etc.), both as an electronic payment instrument or as a contactless smart card, enabling the user to conduct electronic transactions at POS (Point Of Sale) terminals like, for example, ATM (Automated Teller Machine), toll booths, and many other locations where electronic financial transactions are conducted. In this respect, it has to be noted that various systems and methods for using mobile telephones at POS terminals to conduct electronic financial transactions are well-know at the state of the art.

Therefore, the mobile phone 10 comprises an electronic payment instrument module 11 provided with wireless functionality for transmitting and receiving short range radio signals in order to use the phone 10 as an electronic payment instrument Preferably, the mobile phone 10 also comprises at least a keyboard 12 and/or a touchpad/touch screen and a display 13.

In particular, the module 11 comprises a RFID or NFC device (not shown), and it may also comprise a processor (not shown), and a memory (not shown).

Depending on the application, the RFID device of the module 11 may be either passive or active. If passive, it relies on the power from the radio signals of a nearby RFID reader. If active, it has a source of power, such as for example the battery of cell phone 10, and may always be transmitting (or listening for) RFID signals.

In other cases, the RFID device may be a hybrid RFID device that is "asleep" (and draws no power) until either deliberately turned on (e.g., by pressing a designated key of the keyboard 12 of the mobile phone), or upon being placed in proximity to an RFID reader, which reader provides sufficient power through radio signals to "wakeup" the RFID device and thereafter cause it to be powered by its own source (e.g., a battery of the mobile phone 10).

The processor of the module 11 may provide security and other processing means for data to be transmitted or received by the RFID device, with enhanced security level, implemented by programmed codes and logic circuits that encrypts/decrypts data using well known encryption techniques.

The electronic payment instrument module 11 may be interconnected with the mobile phone 10 in several different ways.

For example, in some embodiments, the module 11 may be incorporated into a removable cover of the phone 10 that is attached and connects the module 11 to the phone 10 for communication signalling and for power supply.

In other embodiments, the module 11 may be an RFID card that plugs into a card connector in the phone 10, in particular made in connection with the card connector including a Subscriber Identity Module (SIM) that provides user identification and memory for storage of programming logic and data.

In additional other embodiments, the module 11 may be integrated into the internal circuitry of phone 10 and share functionality with at least some existing components of the phone 10.

The electronic payment instrument module 11 may also be connected to a processor 14 of the mobile phone 10 and, accordingly, in some embodiments at least some of the functionality of the module 11 could be carried out by said processor 14 and by memory devices (not shown) comprised within the mobile phone 10.

The electronic system 1 further comprises a POS (Point of Sale) terminal 20 provided with wireless functionality for communicating with the electronic payment instrument module 11 of the mobile phone 10.

In particular, POS terminal 20 may comprise an RFID reader (not shown) for exchanging information related to electronic transaction data (e.g.: account number, product being purchased, purchase price) with said electronic payment instrument module 11.

The POS terminal 20 may also comprise other elements (not shown), such as a computer, a monitor, a cash drawer, a receipt printer, a customer display and a barcode scanner, a debit/credit card reader, and so on.

Moreover, the system 1 comprises:
- a retailer network 21 associated to a plurality of POS terminals 20 for receiving said electronic transaction data;
- a server 30 that receives the electronic transaction data from the retailer network 21, said server 30 comprising a database 31 that stores the account information associated with the single electronic payment instrument modules 11;
- a service provider 40 which communicates with the mobile phone 10, in particular through a telephone network 50, e.g. a cellular network.

Figure 2:
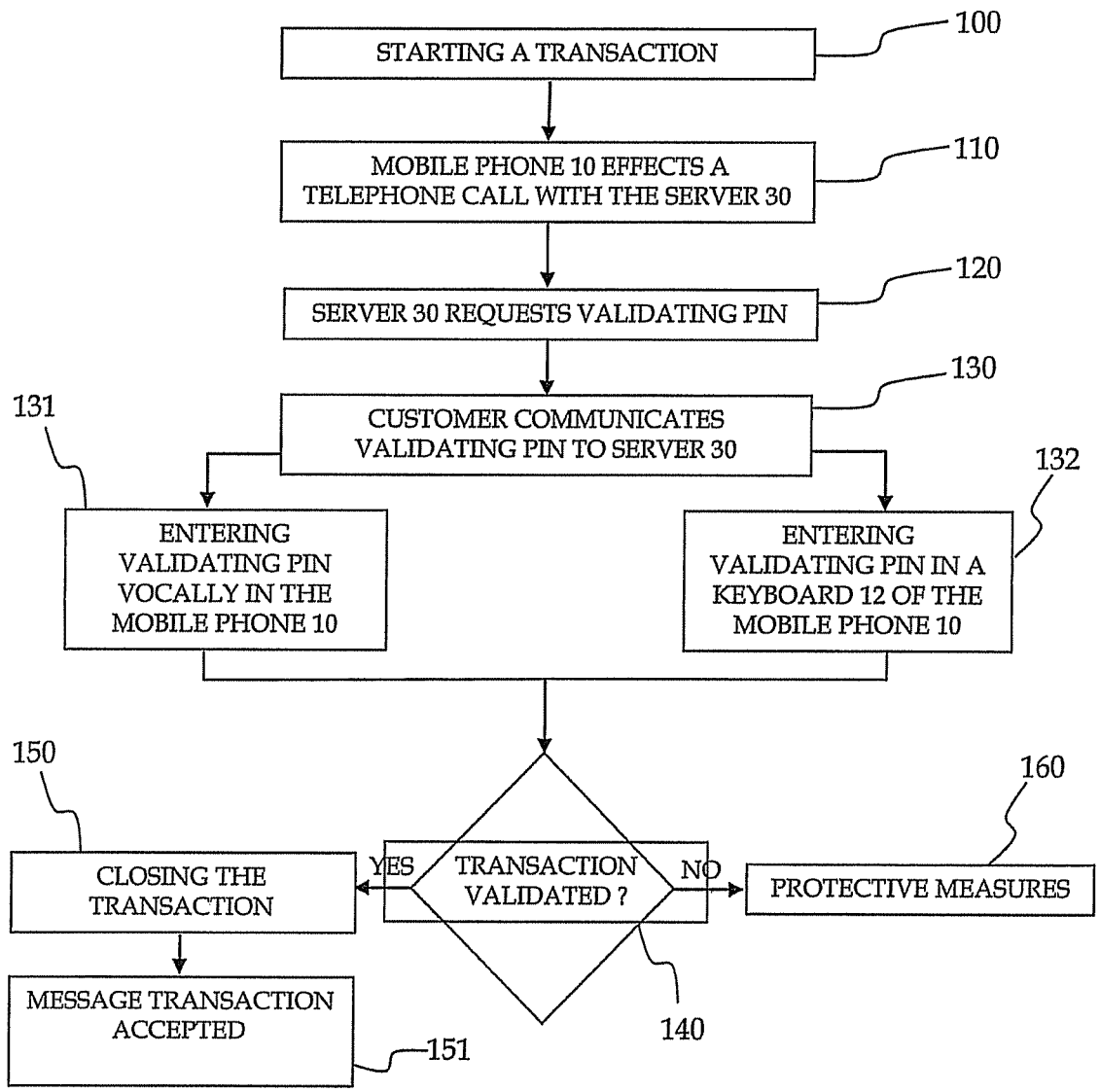
FIG. 2 is a flow chart relating to a to a first embodiment of a method for validating an electronic transaction according to the present invention.

The annexed FIG. 2 shows a first embodiment of a method for validating an electronic transaction made with a mobile phone 10 through the system 1.

In particular, according to the first embodiment of FIG. 2, the system 1 previously described functions as follows.

For starting an electronic transaction (step 100), identifying information (e.g. phone number, account ID or number) are transmitted wirelessly from the electronic payment instrument module 11 of the mobile phone 10 to the POS terminal 20, that forwards said identifying information together with the electronic transaction data to the retailer network 21 and to the server 30.

According to the present invention, the method comprises the following steps:
- the mobile phone 10 is activated (at step 110) for effectuating a voice telephone call to the server 30, in particular through the telephone network 50 and the service provider 40; the telephone number associated to the server 30 (that can be a toll free number) can be manually made by the authorized user of the mobile phone 10 or can be implemented automatically by the mobile phone 10 or sent to the mobile phone, as soon as the POS terminal 20 has finished to acquire said identifying information.
- the server 30 replies (at step 120) to said voice telephone call requesting the customer (i.e. the person who handles said mobile phone 10) to validate the electronic transaction by means of a validating PIN code (in the enclosed drawings mentioned in a short form as "validating PIN"), that is also memorized in the database 31 of the server 30; it must be noted that this validating PIN code can be different from the telephone PIN code that the telephone companies assign usually to every SIM cards and that can be eventually removed by the user. The validating PIN code is instead available only to the authorized telephone user and it cannot be known by a thief who has stolen a mobile phone already switched on and for which the protection barrier constituted by the telephone PIN codes has been already overcome.

The customer validates (at step 130) the transaction communicating the validating PIN code to the server 30 during said telephone call. It can be noted that the validating PIN code can be a complex code, constituted, for instance, by a series of different codes that are requested by the server 30 one after the other and where the next one is requested only if the previous one has been inputted correctly, making in this way practically impossible for a non authorized user to know this complex validating PIN code. Another system for supplying the server 30 with a complex validating PIN code, is to change, every time is performed a voice call for validating an electronic transaction, the type of data that are requested by the server 30. For instance once can be requested as the first part of the complex code the name of the preferred animal of the customer. The next call the name of the preferred movie star, and so on. In this way it is practically impossible for a thief to know all the various data that are requested in a different modes every time a validating proceeding is performed.

In particular, during step 110) the mobile phone 10 is preferably self-activated for effectuating said telephone call, without any action of the customer; however, it is clear that said telephone call may also be started by the customer. What is important, also in the case when a telephone call is self-activated is the fact that the validating PIN code has to be given by the authorized user of the mobile phone in one of the possible manners explained in the following, but never it is sent automatically as the consequence of being stored inside the mobile phone 10. This measure avoids that a stolen mobile phone can send automatically the validating PIN code. Therefore, said validating PIN code should be known only to the authorized user.

At step 140), the server 30 checks if the electronic transaction is validated, in particular by checking if the validating PIN code communicated during the telephone call is correct, i.e. if the validating PIN code communicated at step 130) matches with a validating PIN code memorized in the database 31.

If the validating PIN code is correct and the electronic transaction is validated, the system 1 closes the electronic transaction at step 150). In particular, said step 150) of closing the electronic transaction may be performed by a step 151) in which the server 30 is activated for sending the mobile phone 10 a message informing the customer that the electronic transaction has been accepted and/or completed; said message is preferably sonorous, in particular of a vocal type, but it may also be an SMS (Short Message Service) or another kind of message.

On the contrary, if the validating PIN code communicated at step 130) is incorrect, the system 1 may activate (at step 160) protective measures, in particular relative to the account of the customer. However, it has to be noted that said protective measures may vary according to the decisions taken by the customer or by the authority responsible of the account associated with the electronic payment instrument module 11.

Consequently, it is apparent that the method and the system 1 according to the present invention allow to eliminate the risk of fraudulent electronic transactions, in particular in the case the mobile phone 10 is stolen; in fact, in establishing a telephone call between the mobile phone 10 and the server 30, the person who handles said mobile phone 10 needs to exactly know the validating PIN code, in order to correctly communicate it to the server 30 for validating the electronic transaction.

As a matter of fact, the particular design of the system 1 according to the present invention allows to avoid a multiplication of the efforts needed to avoid the risk of fraudulent electronic transactions, and the system 1 and method according to the present invention require no excessively costly or virtually unfeasible solutions.

Moreover, it is evident that the peculiar provision of establishing a telephone call between the mobile phone 10 and the server 30 allows the method and the system 1 according to the present invention to be very timely and opportune.

In fact, it is known that a telephone call has an absolute priority in a telephone network with respect to other kinds of telephone connection, like SMS; therefore, thanks to the provisions of the present invention, the validating PIN code can be both requested and communicated in a certain and shortest time.

In a preferred embodiment, said step 130) of validating the electronic transaction, the communication of the validating PIN code to the server 30 can be performed by a customer through a step 131) of entering said validating PIN code vocally during a voice telephone call occurring between the mobile phone 10 and the server 30. It is clear that in this case the server 30 will provide guidance voice messages for allowing the customer to give the validating PIN code in an appropriate manner. Moreover the server 30 will be provided with automatic speech recognition means.

However, said step 130) of validating the electronic transaction can also be performed through a step 132) of entering said validating PIN code in the mobile phone 10, in particular through the keyboard 12 or touch screen or touchpad of said mobile phone 10, during the voice telephone call occurring between the mobile phone 10 and the server 30. Also in this case the server 30 will provide guidance voice messages for allowing the customer to give the validating PIN code in an appropriate manner.

Figure 3:
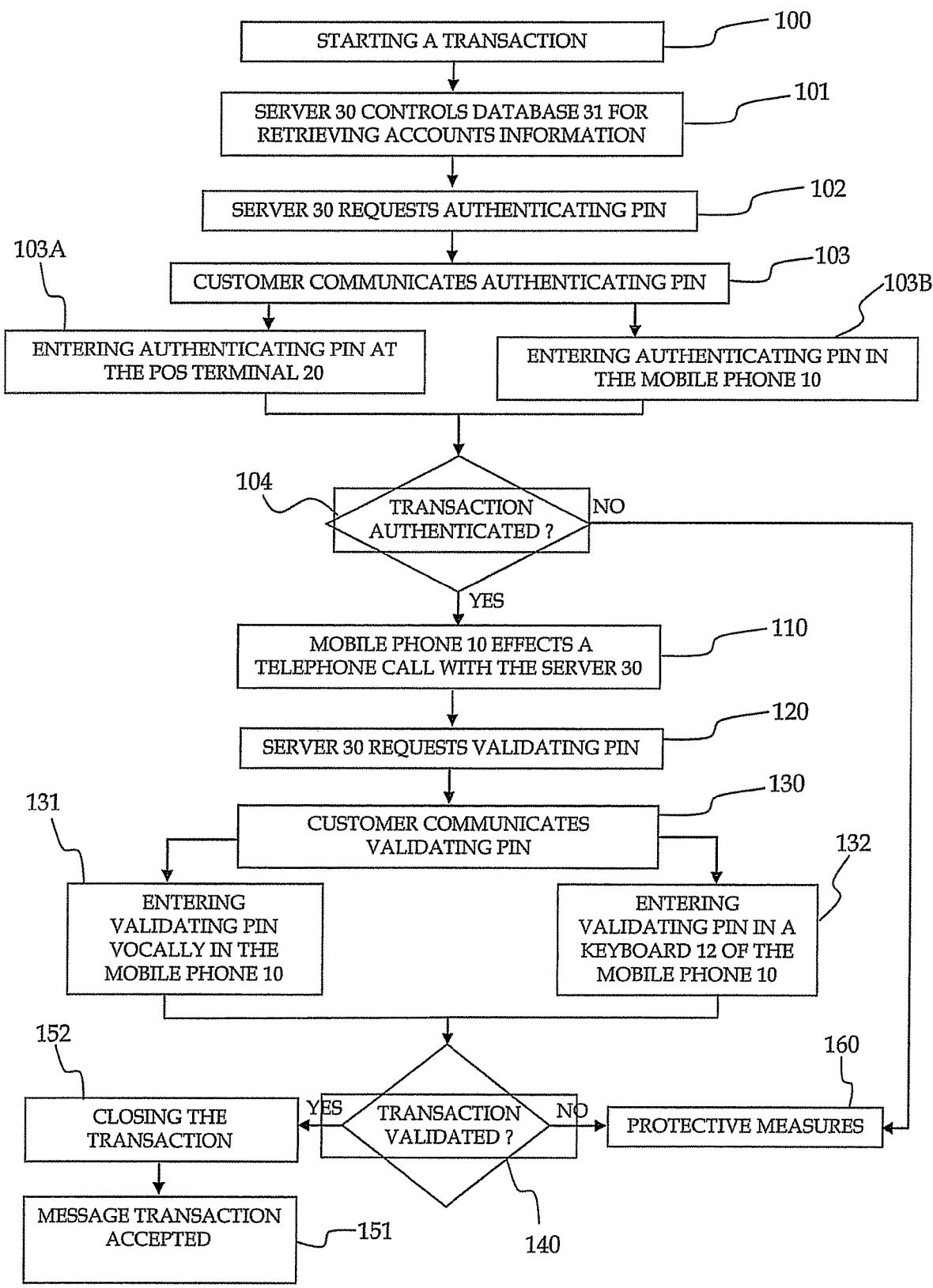
FIG. 3 is a flow chart relating to a second embodiment of a method for validating an electronic transaction according to the present invention.

FIG. 3 shows a second embodiment of a method for validating an electronic transaction made with a mobile 10 through the system 1.

In particular, the method according to the second embodiment of FIG. 3 comprises all the steps of the method according to the first embodiment, the second embodiment being particularly effective in such circumstances when in addition an authenticating PIN code is required by the system 1.

In fact, according to the second embodiment of FIG. 3, the system 1 previously described functions as follows.

For starting an electronic transaction (step 100), identifying information (e.g. phone number, account ID or number) are transmitted wirelessly from the electronic payment instrument module 11 of the mobile phone 10 to the POS terminal 20, that forwards said identifying information together with the electronic transaction data to the retailer network 21 and to the server 30.

Next, at step 101), the server 30 controls the database 31 for retrieving the accounts information associated with the electronic payment instrument module 11 and, at step 102), the server 30 requests the customer (i.e. the person who handle said mobile phone 10) to confirm the transaction by means of an authenticating PIN, that is memorized in a database 31 of the server 30. Preferably, said authenticating PIN is different from the validating PIN code; moreover, also the authenticating PIN is known only by the authorized customer.

At step 103), the customer authenticates the electronic transaction communicating the authenticating PIN to the server 30.

In particular, said step 103) can be performed through a step 103A) of entering said authenticating PIN at the POS terminal 20, in particular in a pad (not shown) of said POS terminal 20.

Alternatively, said step 103) can be performed through a step 103B) of entering said authenticating PIN in the mobile phone 10, in particular in a keyboard 12 of said mobile phone 10. In this case the authenticating PIN can be transferred from the mobile phone 10 to the POS terminal 20, for further processing toward the server 30, through a wireless system, like Bluetooth, etc.

At step 104), the server 30 checks if the electronic transaction is authenticated, in particular by checking if the authenticating PIN communicated at step 103) matches with an authenticating PIN memorized in the database 31.

If the server 30 verifies that the authenticating PIN is correct, the method further comprises the steps previously described with reference to the embodiment of FIG. 2.

On the contrary, if server 30 verifies that the authenticating PIN communicated at step 103) is incorrect, the system 1 activates the protective measures of step 160).

The advantages of a method for validating an electronic transaction, and of a system 1, according to the present invention are apparent from the above description.

In particular, such advantages consist of the fact that the method and the system 1 according to the present invention allow to eliminate the risk of fraudulent transactions, in particular in the case the mobile phone 10 is stolen.

In fact, when the mobile phone 10 establishes a telephone call with the server 30, the person who handles said mobile phone 10 needs to exactly know and communicate the validating PIN code to the server 30 for validating the electronic transaction. Obviously a thief, even if he has the stolen mobile phone perfectly operating in his hands, cannot know what is the validating PIN code.

A further advantage of the method and of the system 1 according to the present invention is that they make it unnecessary to use any excessively costly and virtually unfeasible solutions; as a matter of fact, the method and the system 1 according to the present invention can be implemented without requiring any deep modification to the mobile phone 10 already provided with RFID or NFC features.

Moreover, it is evident that the peculiar provision of establishing a voice telephone call between the mobile phone 10 and the server 30 allows the method and the system 1 according to the present invention to be very timely and opportune.

In fact, it is known that a telephone call has an absolute priority in a telephone network with respect to other kinds of telephone connection, like sending SMS; therefore, thanks to the provisions of the present invention, the validating PIN code can be given in a certain and shortest time.

According to a fourth embodiment of the invention, which can be based on the first embodiment of FIG. 2, it is not the mobile phone 10 that starts the telephone call with the server but the mobile phone receives a voice telephone call from the server. In other words, the voice telephone call for validating the electronic transaction is initiated by the server. The mobile phone 10 or its user replies or accepts the voice telephone call and the server requests the customer to validate the electronic transaction by means of the validating PIN code, in particular the validating PIN code being memorized in the data base 31 of the server 30. The customer validates the electronic transaction by entering the PIN code into the mobile phone 10 and by communicating the validating PIN code to the server 30 during the voice telephone call. Hence, according to the fourth embodiment, the voice telephone call is initiated or started by the server. The telephone number of the mobile phone of the customer can for example be transmitted wirelessly by the mobile phone 10 together with the identifying information to the PUS terminal 20 which then forwards the identifying information (including the telephone number) of the mobile phone together with transaction data to a retailer network and to a server.

According to the invention, the voice telephone call used for validating the electronic transaction can be initiated by the mobile phone or it can be initiated by the server. If the voice telephone call for validating the electronic transaction is initiated by the server, the user of the microphone does not need to enter the telephone number of the server such that the fourth embodiment appears to be very convenient for the user.

The use of a voice telephone call for validating the electronic transaction is advantageous as with the voice telephone call there will be no delay as is possible for example with SMS.

The method and the system described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to the above-described method and system for validating an electronic transaction, but may be subject to many modifications, improvements or replacements of equivalent parts and elements without departing from the inventive idea, as clearly specified in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A system for validating an electronic transaction between a customer and a merchant, said validating being facilitated via use of a mobile device provided with wireless functionality for transmitting and receiving short range radio signals in order to use the mobile device as an electronic payment instrument, the system comprising:

a mobile device having stored therein certain identifying information associated with the customer, including a mobile phone number associated with the mobile device, wherein the mobile device includes a hybrid RFID device that, when in a sleep state, draws no power until the hybrid RFID device is placed in proximity to an RFID reader and the RFID reader provides power through radio signals to wake up the hybrid RFID device such that the hybrid RFID device transitions from the sleep state to an awake state, the hybrid RFID device being powered by a battery of the mobile device when in the awake state;

a point of sale (POS) terminal associated with the merchant, said POS terminal including the RFID reader; and a server associated with a service provider in communication with the mobile device and the POS terminal, and wherein the mobile device, the POS terminal and the server each include executable instructions, which when executed on each respective device, perform the following actions with respect to the electronic transaction:

while the hybrid RFID device is in the sleep state and drawing no power, the hybrid RFID device receiving a radio signal from the RFID reader, the radio signal providing power to awaken the hybrid RFID device such that the hybrid RFID device transitions from the sleep state to the awake state and such that the hybrid RFID device begins to draw power from the battery of the mobile phone;

after the hybrid RFID device is in the awake state, the mobile device accessing the identifying information, encrypting the accessed identifying information, and wireles sly transmitting the encrypted identifying information to the POS terminal via the hybrid RFID device and the RFID reader;

the POS terminal forwarding said identifying information together with transaction data associated with the electronic transaction to the server;

the server controlling a database to retrieve account information previously associated with the mobile device and stored in the database;

the server initiating a first voice call to the mobile phone number associated with the mobile device and making a first request via the first voice call for the customer to authenticate itself by means of an authenticating PIN code previously associated with the identifying information of the mobile device and stored in a database of the server;

the customer providing first input in response to the first request, the first input being provided to the POS terminal and then transmitted by the POS terminal to the server; and the server checking the first input received from the customer against the authenticating PIN code associated with the mobile device as stored in the database of the server.

2. The system of claim 1, wherein the first input is manually entered on the POS terminal, and the POS terminal transmits the first input to the server.

3. The system of claim 1, wherein the first input is entered on the mobile device, the mobile device wirelessly transmits the first input to the POS terminal, and the POS terminal transmits the first input to the server.

4. The system of claim 3, wherein the first input is verbally entered into the mobile device.

5. The system of claim 3, wherein the first input is manually entered into the mobile device.

6. The system of claim 3, wherein authenticating PIN code is not stored on the mobile device.

7. The system of claim 6, further comprising:

if the first input does not match the authenticating PIN code the process is terminated, otherwise:

the mobile device initiating a second voice call with the server, wherein said mobile device is self-activated for effectuating said voice telephone call, and wherein said second voice call establishes a synchronous session connection between the server and the mobile device;

the server making a second request via the second voice call for the customer utilizing the mobile device to validate the electronic transaction by means of a validating PIN code, wherein the validating PIN code is different from the authenticating PIN code;

the mobile phone (i) receiving second input from the customer to validate the electronic transaction, and (ii) communicating the second input to the server via said voice telephone call as part of the synchronous session, and wherein the electronic transaction is only validated if second input matches the validating PIN code and the synchronous session connection is active.

8. The system of claim 7, wherein the validating PIN code is not stored on the mobile device.

9. The system of claim 8, wherein the validating PIN code is a complex code selected from at least one of:

a plurality of unique, multi-character passwords that are requested sequentially by the server;

a plurality of unique, multi-character passwords, one of which is randomly requested by the server.

10. The system of claim 9, wherein the electronic transaction is closed if the validating PIN code is correct and the transaction is validated.

11. The system of claim 10, further comprising in the event that the validating PIN code is correct and the transaction is validated, the mobile phone receiving message informing the customer that the electronic transaction has been accepted and/or completed.

12. The system of claim 11, wherein the second input is made verbally during the second voice call between the mobile device and the server.

13. The system of claim 11, wherein the second input is entered manually on the mobile device during the second voice call between the mobile device and the server.

14. The system of claim 13, wherein protective measures are activated if the server determines that either the authenticating PIN code or the validating PIN code is incorrect.

15. A system for validating an electronic transaction between a customer and a merchant, said validating being facilitated via use of a mobile device provided with wireless functionality for transmitting and receiving short range radio signals in order to use the mobile device as an electronic payment instrument, the system comprising:

a mobile device having stored therein certain identifying information associated with the customer, including a mobile phone number associated with the mobile device, wherein the mobile device includes a hybrid RFID device that, when in a sleep state, draws no power until the hybrid RFID device is placed in proximity to an RFID reader and the RFID reader provides power through radio signals to wake up the hybrid RFID device such that the hybrid RFID device transitions from the sleep state to an awake state, the hybrid RFID device being powered by a battery of the mobile device when in the awake state;

a point of sale (POS) terminal associated with the merchant, said POS terminal including the RFID reader; and a server associated with a service provider in communication with the mobile device and the POS terminal, and wherein the mobile device, the POS terminal and the server each include executable instructions, which when executed on each respective device, perform the following actions with respect to the electronic transaction:

while the hybrid RFID device is in the sleep state and drawing no power, the hybrid RFID device receiving a radio signal from the RFID reader, the radio signal providing power to awaken the hybrid RFID device such that the hybrid RFID device transitions from the sleep state to the awake state and such that the hybrid RFID device begins to draw power from the battery of the mobile phone;

after the hybrid RFID device is in the awake state, the mobile device accessing the identifying information, encrypting the accessed identifying information, and wireles sly transmitting the encrypted identifying information to the POS terminal via the hybrid RFID device and the RFID reader;

the POS terminal forwarding said identifying information together with transaction data associated with the electronic transaction to the server;

the server controlling a database to retrieve account information previously associated with the mobile device and stored in the database;

the server initiating a first voice call to the mobile phone number associated with the mobile device and making a first request via the first voice call for the customer to authenticate itself by means of an authenticating PIN code previously associated with the identifying information of the mobile device and stored in a database of the server;

the customer providing first input in response to the first request, the first input being provided to the POS terminal and then transmitted by the POS terminal to the server;

the server checking the first input received from the customer against the authenticating PIN code associated with the mobile device as stored in the database of the server;

if the first input does not match the authenticating PIN code the process is terminated, otherwise:

the mobile device initiating a second voice call with the server, wherein said mobile device is self-activated for effectuating said voice telephone call, and wherein said second voice call establishes a synchronous session connection between the server and the mobile device;

the server making a second request via the second voice call for the customer utilizing the mobile device to validate the electronic transaction by means of a validating PIN code, wherein the validating PIN code is different from the authenticating PIN code;

the mobile phone (i) receiving second input from the customer to validate the electronic transaction, and (ii) communicating the second input to the server via said voice telephone call as part of the synchronous session, and wherein the electronic transaction is only validated if second input matches the validating PIN code and the synchronous session connection is active.

16. The system of claim 15, wherein the first input is manually entered on the POS terminal, and the POS terminal transmits the first input to the server.

17. The system of claim 15, wherein the first input is entered on the mobile device, the mobile device wirelessly transmits the first input to the POS terminal, and the POS terminal transmits the first input to the server.

* * * * *